United States Patent
Saniei et al.

(10) Patent No.: US 12,521,921 B2
(45) Date of Patent: Jan. 13, 2026

(54) ANISOTROPIC THIN FOAMED POLYETHYLENE SHEET AND APPLICATIONS THEREOF

(71) Applicant: MuCell Extrusion, LLC, Woburn, MA (US)

(72) Inventors: Mehdi Saniei, Belmont, MA (US); James K. Sakorafos, Shrewsbury, MA (US); Nicholas R. Torraco, Arlington, MA (US); Mark E. Lindenfelzer, Milton, MA (US)

(73) Assignee: MuCell Extrusion, LLC, Woburn, MA (US)

( * ) Notice: Subject to any disclaimer, the term of this patent is extended or adjusted under 35 U.S.C. 154(b) by 0 days.

(21) Appl. No.: 16/193,043

(22) Filed: Nov. 16, 2018

(65) Prior Publication Data

US 2020/0156293 A1    May 21, 2020

(51) Int. Cl.
| | |
|---|---|
| *B29C 44/50* | (2006.01) |
| *B29C 44/06* | (2006.01) |
| *B29K 23/00* | (2006.01) |
| *B32B 5/18* | (2006.01) |
| *B32B 5/22* | (2006.01) |
| *B32B 5/32* | (2006.01) |
| *B32B 27/06* | (2006.01) |
| *C08J 9/12* | (2006.01) |

(52) U.S. Cl.
CPC .......... *B29C 44/507* (2016.11); *B29C 44/06* (2013.01); *B32B 5/18* (2013.01); *B32B 5/22* (2013.01); *B32B 5/32* (2013.01); *B32B 27/065* (2013.01); *C08J 9/122* (2013.01); *B29K 2023/0625* (2013.01); *B32B 2307/5825* (2013.01); *B32B 2307/706* (2013.01); *B32B 2323/04* (2013.01); *C08J 2201/03* (2013.01); *C08J 2203/06* (2013.01); *C08J 2203/08* (2013.01); *C08J 2323/06* (2013.01)

(58) Field of Classification Search
CPC . B32B 5/32; B32B 2323/04; B32B 2307/706; C08J 9/122; C08J 2203/08; C08J 2323/06; B29K 2023/0625
See application file for complete search history.

(56) References Cited

U.S. PATENT DOCUMENTS

| | | | | |
|---|---|---|---|---|
| 6,114,025 | A * | 9/2000 | DeVaudreuil | B32B 5/18 428/319.9 |
| 6,593,386 | B1 * | 7/2003 | Malwitz | C08J 9/141 521/134 |
| 6,884,377 | B1 * | 4/2005 | Burnham | B29C 44/461 264/53 |
| 10,011,697 | B2 * | 7/2018 | Van der Ven | C08J 9/14 |
| 2003/0027878 | A1 * | 2/2003 | Nodono | C08J 9/12 521/81 |
| 2004/0080070 | A1 * | 4/2004 | Liu | B29C 44/3453 264/51 |
| 2008/0038533 | A1 * | 2/2008 | Best | B32B 27/32 428/220 |
| 2014/0272229 | A1 * | 9/2014 | Xing | C08J 9/12 428/36.5 |
| 2016/0059515 | A1 * | 3/2016 | Perick | B32B 5/18 428/215 |

* cited by examiner

*Primary Examiner* — Hai Vo
(74) *Attorney, Agent, or Firm* — Wolf, Greenfield & Sacks, P.C.

(57) ABSTRACT

An anisotropic multilayer film comprising one or more foam layers is described herein.

11 Claims, No Drawings

ANISOTROPIC THIN FOAMED POLYETHYLENE SHEET AND APPLICATIONS THEREOF

FIELD OF INVENTION

This invention relates to an anisotropic multilayer film comprising one or more foam layers, wherein at least one layer comprises 10 to 100 percent by weight LLDPE with a melt index of 0.2 to 2 g/10 min. The film in this invention can have a surface with an average Sheffield smoothness, according to TAPPI T 538, of less than 100. The film in this invention can have a puncture propagation tear resistance, in accordance with ASTM D2582, greater than 650 g/mil.

The present invention relates to an anisotropic foamed polyethylene film comprising at least one layer of linear low-density polyethylene (LLDPE) wherein an inert gas such as carbon dioxide, nitrogen or a mixture of carbon dioxide and nitrogen is introduced into the polymer melt to enhance processability. The fabrication of monolayer or multilayer films, with or without foamed layers, is within the scope of this invention and technique. The films can be used in a wide range of applications such as trash bags, grocery bags, food wrap, sous vide packaging, standup pouches, pet food bags, surface protection, and liquid packaging.

BACKGROUND OF INVENTION

Due to the commercial significance of polymer films, it is imperative to improve the properties of the film products. More specifically the mechanical property can be improved by various methods such as manipulating the structure of the resin or taking advantage of particular additives. In a blown film process, typically the tear strength in the machine direction (MD) deteriorates due to the alignment of polymer chains. The cells in the foamed film are also very prone to be elongated in the machine direction which may increase the amount of cell coalescence and hence the mechanical properties can be further deteriorated.

To improve the mechanical properties and more specifically the tear strength of the film, crosslinking is an option, however, it adds to the cost and complexity of the process and results in a non-recyclable product. Traditionally, high melt index (high-MI) linear low-density polyethylene (LLDPE) is blended with LDPE, which is widely used in a blown film line, to improve the tear strength in the machine direction, tensile strength, and elongation at break. On the other hand, high-MI LLDPE shows relatively poor melt strength which is a crucial factor to stabilize the blown bubble. For this reason, the use of high-MI LLDPE resin is limited to a small fraction in a blend with LDPE. The use of the fractional melt index LLDPE or low-MI LLDPE in blown film process is not conventionally of interest due to the difficulties in processing and achieving a good surface quality.

The surface quality and smoothness of the thin film, and the blown bubble depends on a few factors including die geometry, molecular weight and molecular weight distribution of the resin, flow rate, and the structure of the polymer. Extrusion instability manifests first as the presence of any nonuniformity on the extrudate's surface or in the cross section along the machine direction, defined as the melt fracture, which results in a film with a poor appearance. Sharkskin melt fracture is observed for many linear polymers such as HDPE and LLDPE. Most commercially available branched polymers including LDPE, however, shows gross melt fracture which happens at much higher wall shear stress compared to the shear stress at which sharkskin melt fracture starts to happen. In extrusion foam processing, the inclusion of a blowing agent which results in a different viscosity behavior of a melt during processing have a significant effect on the melt fracture of the polymers, hence the improvement of the surface quality of the film. The printing quality on the film is determined by a few important parameters based on the printing method, all of which are mutually dependent on the surface smoothness of the film to result in a uniform ink coverage on the surface of the film.

Martinez et al. disclosed, in their U.S. Pat. No. 8,512,837B2, a foamed film produced by using a chemical and physical blowing agent together, using a blend of LDPE and LLDPE with a specific fabrication condition. Their blend comprised a high-MI LLDPE and low-MI branched LDPE which provided a balance of mechanical strength from the LLDPE fraction and an adequate amount of melt strength from highly branched LDPE fraction to help inflating the bubble. Martinez et al. assert that the use of LLDPE in non-cross-linked foaming applications has been limited to a small amount where the major component is high melt strength LDPE. This is mainly because LLDPE possesses a poor melt strength which further becomes worse for the grades with a higher melt index. Accordingly, Martinez et. al. stated that the traditional methods of increasing the MD tear strength such as the use of low MI LLDPE or the use of pure or rich blends of LLDPE resin, in general, are not necessarily viable for foamed applications and thus no foam film having a thickness of 1 to 10 mils are known to have a sufficient and satisfactory MD tear strength. So, Martinez et al. employed a particular blend of LLDPE and LDPE together with specific fabrication condition to make a foamed film of a thin gauge with MD tear properties similar to an equivalent gauge non-foamed sheet of the same composition.

In their patent U.S. Ser. No. 10/011,697B2, Van der Ven et al. disclosed a polyethylene foamed film comprising a blend of LDPE, LLDPE, and HDPE, wherein 0.5 to 4.5 percent by weight of HPDE is added into the blend. Those skilled in the art will recognize that a small amount of HDPE is often added to a blend of LDPE and LLDPE which can improve the miscibility. For example, De Vos et al., in EP2164893B1, disclose the use of HDPE in the formulation of a polyethylene foam.

In a conventional blown film line, the production of film from LLDPE is mostly avoided because of the extensive amount of difficulties in processing. The most important of which is forming a stable bubble using a high MI LLDPE that exhibits a poor melt strength. In the current invention, we are using LLDPE with a very low melt index, or fractional melt index, which can offer an enhanced MD tear strength, improved gas and moisture permeation properties compared to that of LDPE, far better environmental stress cracking resistance, and an enhanced tensile strength at yield.

Processing of either a rich blend or pure LLDPE with a fractional or a very low melt index in a blown film line with a very narrow gap and producing a film with a smooth surface has been very challenging. The rationale behind using such a polymer blend is to take advantage of the good properties of an inexpensive and commercially available LLDPE and mLLDPE, more specifically the grades with a very low melt index, which is of our most interest, and one of the objectives of this invention.

We benefited from the introduction of inert gas into the polymer melt. The plasticization effects of the dissolved blowing agents, which alters the viscosity of the resin, makes us capable of processing the low melt index resin through a very narrow gap. In foaming applications, operating through a narrow gap results in a high extrusion pressure favorable for foaming. That is, not only it increases the solubility and keeps the gas dissolved in the polymer until the die exit, but also causes a high pressure drop rate. This abrupt and significant drop in pressure causes large numbers of nuclei to be formed and suppresses the growth of the bubbles, resulting in smaller cells in the foam structure. The viscosity modification caused by a small amount of dissolved gas, e.g. less than 0.5 wt %, may hinder or delay the occurrence of shark skin melt fracture and results in a very smooth surface quality to the film.

SUMMARY OF INVENTION

This invention relates to a multilayer thermoplastic film comprising one or more foam layers, wherein at least one layer comprises 10 to 100 percent by weight LLDPE with a melt index of 0.2 to 2 g/10 min.

The film in this invention can have a surface with an average Sheffield smoothness, according to TAPPI T 538, of less than 100, specifically less than 50, more specifically less than 20, and the most specifically less than 10.

The film in this invention can have a puncture propagation tear resistance, in accordance with ASTM D2582, greater than 650 g/mil, preferably greater than 750 g/mil, and most preferably greater than 900 g/mil.

An inert gas such as nitrogen, or carbon dioxide, or a mixture of carbon dioxide and nitrogen, in the supercritical state, can be introduced into the extruder at a very high injection pressure to form a single-phase polymer/gas mixture which improves the processing ability of the polymer.

In some embodiment, the resin used can be a rich blend of LLDPE with a fractional or very low melt index in the range of 0.2 to 2 gr/10 min as determined in accordance with ASTM D1238, and a density in the range of 0.915 to 0.935 gr/cm$^3$.

The film of this invention can be used in a wide range of applications in packaging such as collation shrink, pouches, lamination, pet food bags, surface protection, trash bag, grocery bags, food wrap, pallet wrap, shrink film, labels, and pouches for FFS packaging. The fabrication of a monolayer foam film is within the scope of this invention.

DETAILED DESCRIPTION

The singular forms "a," "an," and "the" include plural referents unless the context clearly dictates otherwise.

As used in the specification and in the claims, the term "comprising" may include the embodiment "consisting of" and "consisting essentially of."

All ranges disclosed herein are inclusive of the recited endpoint and independently combinable (for example, the range of from 2 grams to 10 grams" is inclusive of the end points, 2 grams and 10 grams, and all the intermediate values)

As used herein, approximating language may be applied to modify any quantitative representation that may vary without resulting in a change in the basic function to which it is related. Accordingly, a value modified by a term or terms, such as "about" and "substantially," may not be limited to the precise value specified. The modifier "about" should also be considered as disclosing the range defined by the absolute value of the two endpoints. For example, the expression "from about 2 to about 4" also discloses the range "from 2 to 4".

The present disclosure relates to multilayer or monolayer polyethylene foam film suitable to be used in a wide range of applications such as collation shrink, pouches, lamination, pet food bags, surface protection, agricultural films, geomembrane, packaging, trash bag, grocery bags, food wrap, pallet wrap, shrink film, labels, and pouches for FFS packaging. The fabrication of either a monolayer or a multilayer film is within the scope of this invention and technique and one or more layers of the film may be foamed.

The term "anisotropic" refers to the fact that certain properties of the foamed film differs depending on the direction along which the property is measured. For the purpose of this disclosure, properties were measured against two direction (in-flow or machine direction (MD), and cross-flow or transverse direction (TD)) which are perpendicular to each other.

The term "foam" in this invention refers to a cellular structure formed when a gas is blown into the molten polymer, and bubbles nucleate when the gas diffuses out of the polymer, right after the application of a thermodynamic instability, as the polymer solidifies.

Generally, the desired application of a thin film determines the essential physical and mechanical properties of the film which subsequently concludes the best resin or a blend of a few resins and additives for processing. Furthermore, the processing properties is a crucial factor in material selection. More specifically, in the blown film process of this invention where the head pressure is high because of a very narrow gap, the melt fracture should be avoided, and the resin should have a good thermal stability and high enough melt strength. Various thermoplastics can be used in the blown film process of this invention such as polyethylene (PE), polypropylene (PP), polystyrene (PS), ethylene vinyl acetate (EVA), ethylene vinyl alcohol (EVOH), polyvinyl chloride (PVC), Polyvinylidene chloride (PVDC), polyamide (PA), polyurethane (PU), or any of the resins known as TPE family such as, but not limited to, propylene-ethylene copolymer, Thermoplastic Olefin (TPO), Thermoplastic Polyurethane (TPU). The LLDPE copolymer in this invention can include an α-olefin co-monomer such as butene, hexane, or octene.

The choice of material in this invention could be determined in separate ways based on processing requirements, product properties, and material specification. The processing requirement in a blown film process dictates the use of a high melt strength resin to get a stable bubble. Low-density polyethylene (LDPE) is relatively easy to process resin at a lower processing temperature compared to HDPE. Because of the existence of long chain branching, all LDPE grades show a rather high processing melt strength. Therefore, an entirely stable bubble with a relatively low frost line height can be examined with a PE blend the majority of which is LDPE. Moreover, LDPE shows an elongational thickening behavior which can further increase the melt strength and can cause strain hardening. On the other hand, generally LDPE presents a rather low tear strength along the machine direction (MD).

Typically, film manufacturers capitalize on a blend of LDPE and high-MI LLDPE, while the blend is an immiscible blend in many cases, wherein LDPE improves the processing ability and ductility while the LLDPE enhances the modulus and strength. In a conventional blown film line, the production of the film from LLDPE is mostly avoided because of the extensive amount of difficulties in processing. The most important of which is forming a stable bubble using a high MI LLDPE that exhibits a poor melt strength. In this invention, we are using LLDPE with a very low melt index, or fractional melt index, which can offer an enhanced MD tear strength, improved gas and moisture permeation properties compared to that of LDPE, far better environmental stress cracking resistance, and an enhanced tensile strength at yield.

In blown film extrusion, typically sharkskin melt fracture occurs when LLDPE is processed through a narrow die gap. Furthermore, LLDPE with low melt index, which offers an improved toughness, shows a higher tendency to melt fracture than a high-MI LLDPE, as do metallocene catalyzed resins (mLLDPE) which have a narrow molecular weight distribution than conventional LLDPEs. In this invention, a very small and precise amount of supercritical gas, as a processing aid and blowing agent, is injected into the molten polymer at a high pressure, for example greater than 34 bar, inside an efficient and effectual mixer, e.g., cavity transfer mixer, as an extension to the extruder's barrel. For example, the supercritical blowing agent used in this invention can be either nitrogen, carbon dioxide or a mixture of nitrogen and carbon dioxide. The temperature of the mixer could be accurately controlled within ±1° C. The inclusion of a very small amount of gas could offer a few important advantages in blown film extrusion. First, it could reduce the back pressure which allows processing at a higher throughput and delayed any bubble instability. Therefore, melt fracture could be reduced significantly. Second, the possibility of using a very low melt index LLDPE with narrow molecular weight distribution, to include metallocene α-olefin copolymers, became viable for processing to improve the film properties.

In some embodiments, The LLDPE component of the resin has a melt index in the range 0.1 to 1.2 g/10 min as is determined by ASTM D1238. The LLDPE component of the resin can have a density of 0.915 to 0.935 $g/cm^3$. The polyethylene resin may be comprised of 70 to 90 percent by weight copolymer and from 30 to 10 percent by weight homopolymer, corresponding to 100 percent by weight. The LLDPE component of the resin may be a copolymer containing one or more of the α-olefins; 1-butene, 1-hexene, 4-methyl-1-pentene, and 1-octene. In another case, the polyethylene resin can be a blend of 51 to 99 percent by weight LLDPE with a very low MI in the range of 0.2 to 1 g/10 min, as determined by ASTM D1238, and 1 to 49 percent by weight LDPE. In some cases, the polyethylene blend may contain up to 10 percent by weight HDPE that might improve the miscibility of the blend. Also, for example, the LLDPE component of the resin may be a blend of mLLDPE and LLDPE.

In some cases, at least one layer of the film has 0.05 to 15 percent by weight of an inorganic additive, an organic additive or a mixture of an inorganic and an organic additive. In some other cases, the polymer composition of each layer may comprise some apt amounts of other additives to include pigments, antistatic agents, UV stabilizers, and antioxidant. In another embodiment, at least one layer includes a clarifying agent at less than 1 percent by weight, preferably less than 0.5 percent by weight, more preferably less than 0.1 percent by weight, and mostly preferably less than 0.05 percent by weight.

A multilayer film, comprising at least one foam layer, fabricated using this invention in a blown film process has sets of significantly improved physiomechanical properties compared to the film articles of the prior art, to the best of applicant's knowledge, as in particular puncture propagation tear (PPT) resistance, acc. to ASTM D2582, can be greater than 650 g/mil, more specifically can be greater than 750 g/mil, and most specifically can be greater than 900 g/mil. In some cases, the MD tear resistance, acc. to ASTM D9929, can be greater than 100 g·mil, more specifically can be greater than 200 g/mil, and most specifically can be greater than 300 g/mil. In some embodiments, the foam film resulting from the present invention has a far better cellular morphology compared to the existing prior arts, as it can have uniformly distributed cells with an average cell size of 10-100 μm, an average cell density of $10^2$-$10^9$ $cells/cm^3$, and an expansion ratio of the foamed layer from 1 to 9. in one other case, the expansion ratio of any foamed layer is less than 1.1 compared to the non-foamed layer of the same composition.

All the equipment used in this invention are very well-known to the skilled persons in the art and well labeled and extensively described in the literature. In some cases, the film can be produced by the blown film process using an annular die with a die gap from 0.45 to 1.3 mm and a blow-up ratio ranging from 2:1 to 3.5:1. Higher blow-up ratios can result in a more balanced MD/TD orientation which improved overall film toughness. The die geometry and specification may be manufactured according to the patent with the application number of US 2012/0228793 A1.

As it was explained earlier, a very small amount of a physical blowing agent in a super critical condition can be injected into the molten resin, at a very precisely controlled rate, inside a mixer with a very effectual distributive and dispersive element before entering the annular die. This unit is controlled as a separate temperature zone with an accuracy of ±1° C. and a gas injection pressure variation below 1%. The plasticization effect of the gas results in a viscosity change of the molten resin, specifically the aforementioned low-MI PE resin, which enhances the processibility of the resin at a lower temperature compared to the processing temperature which is used conventionally. This also may benefit and assist ones to manipulate the crystallization kinetics of the resin to improve a few properties.

In the blown film process of this invention, because of the overall high specific heat capacity of polyethylene, the transverse stretch of the bubble could be delayed until the film became cooler, which enhanced the bubble stability and the frost line height. This caused the bubble expansion in transverse direction to occur at a lower temperature and shorter period of time which is very effective to increase the molecular orientation in the transverse direction, therefore, to improve the MD tear strength.

In some other embodiments the film in this invention can be produced by the blown film process, cast film process, or any method known in the art.

The following examples demonstrate the process of the present disclosure. The examples are only demonstrative and are intended to put no limit on the disclosure with regards to the materials, conditions, or the processing parameters set forth herein.

Examples

Samples of multilayer film (three layers) were produced on a blown film line comprising one 80 mm main extruder and two 70 mm co-extruders. The core extruder was equipped with a supercritical gas injection unit, capable of injecting nitrogen or carbon dioxide, and a 90 mm MuCell Transfer Mixer, both from MuCell Extrusion LLC.

All samples were produced with a polyethylene blend comprising LLDPE copolymer with an α-olefin co-monomer comprises 1-octene with MFI=1 and the density of 0.935. The foamed core layer of all samples contains talc as the cell nucleating agent which was added in the form of a 67% talc filled LDPE masterbatch. The solid layers comprised from 53.5 wt % to 86 wt % the aforementioned LLDPE of the total composition.

Supercritical nitrogen was used as a physical blowing agent and was injected into the MuCell Transfer Mixer (MTM) at the concentration from 0.0662% to 0.0737%, very accurately, into the molten polymer. To characterize the tear and impact resistance of the foam films a Spencer Impact tester from Thwing-Albert, capable of performing the Elmendorf tear resistance test and Spencer impact test, was used. The smoothness of the products (Sheffield unit) was evaluated using a Gurley™ 4340 Automatic Densometer & Smoothness Tester.

| Sample | Sample E | Sample F | Sample G |
|---|---|---|---|
| Density (gr/cm$^3$) | 0.78 | 0.76 | 0.81 |
| Thickness (um) | 102 | 94 | 92 |
| Throughput (kg/hr) | 422.4 | 421.7 | 422.5 |
| PBA % | 0.0662 | 0.0737 | 0.0727 |
| Basic weight (gr/m$^2$) | 79.6 | 71.4 | 74.5 |
| Line speed (m/min) | 17.8 | 19 | 18.2 |
| Die Gap (mm) | 0.6 | 0.6 | 0.6 |

| Layers | Skin A | Core | Skin B | Skin A | Core | Skin B | Skin A | Core | Skin B |
|---|---|---|---|---|---|---|---|---|---|
| LLDPE wt %, MFI 1 | 76 | 63.5 | 55 | 76 | 53.5 | 55 | 86 | 53.5 | 55 |
| 67% talc filled LDPE | 0 | 15 | 0 | 0 | 15 | 0 | 0 | 15 | 0 |
| Layer Thickness (um) | 25.5 | 50.3 | 26.3 | 23.2 | 47.7 | 23.2 | 24.1 | 43.8 | 24.1 |
| Layer Density (gr/cm$^3$) | 0.97 | 0.59 | 0.95 | 0.97 | 0.56 | 0.95 | 0.97 | 0.64 | 0.95 |
| Layer Throughput (kg/hr) | 131 | 158.7 | 132.7 | 132.5 | 158.8 | 130.4 | 132.5 | 159.6 | 130.4 |
| Layer Volume Ratio (%) | 25 | 49.3 | 25.7 | 24.6 | 50.7 | 24.7 | 26.2 | 47.6 | 26.2 |
| Tear Strength MD (grf) | | 1137.1 | | | 1055.5 | | | 866.1 | |
| Tear Strength TD (grf) | | 1574.4 | | | 1715 | | | 1518.9 | |
| Tensile Str at Break MD (MPa) | | 19.4 | | | 18.2 | | | 19.3 | |
| Tensile Str at Break TD (MPa) | | 17.3 | | | 17.5 | | | 16.8 | |
| Yield Stress MD (MPa) | | 11.1 | | | 10.1 | | | 10.5 | |
| Yield Stress TD (MPa) | | 10.3 | | | 10.25 | | | 9.7 | |
| Elongation at Break MD (%) | | 942 | | | 892 | | | 918 | |
| Elongation at Break TD (%) | | 970 | | | 928 | | | 928 | |
| 1% Sec. Modulus MD (MPa) | | 325 | | | 285 | | | 294 | |
| 1% Sec. Modulus TD (MPa) | | 299 | | | 317 | | | 287 | |
| Toughness MD (in. lbf/in$^3$) | | 15988 | | | 14509 | | | 15731 | |
| Toughness TD (in. lbf/in$^3$) | | 15432 | | | 14343 | | | 13549 | |
| PPT MD (grf) | | 2604.3 | | | 2989.8 | | | 2603.3 | |
| PPT TD (grf) | | 5072.4 | | | 4390.3 | | | 4309.8 | |
| PPT MD (gr/mil) | | 667.1 | | | 902.4 | | | 783.7 | |
| PPT TD (gr/mil) | | 1299.2 | | | 1325.2 | | | 1297.4 | |
| Tear length in PPT MD (cm) | | 2.9 | | | 3.2 | | | 3.4 | |
| Tear length in PPT TD (cm) | | 1.6 | | | 1.8 | | | 1.4 | |
| Smoothness (Sheffield Unit) | | 9.8 | | | 6.9 | | | 10.7 | |

All the samples listed in the table above were made with the same processing condition and the same throughput. Sample F was made based on the sample E but with a lower weight per unit area and the same resin composition by the inclusion of a higher amount of supercritical gas up to 0.0737%. The Sheffield smoothness of the film in sample F improved, e.g. down to 6.9 Sheffield unit, as well as the puncture propagation tear resistance of the film, e.g. up to about 900 gr/mil. Sample G was made based on sample F, but with the inclusion of higher amount of LLDPE in the Skin A which resulted in a little higher PPT. The tensile properties, including the yield strength, as well as the tear strength in the machine direction for all the samples were comparable to, or in some case surpasses, that of the similar foam films or equivalent solid counterparts in existing prior art.

The invention claimed is:

1. A foamed film comprising three co-extruded anisotropic layers including one core foam layer between, and in direct contact with, two solid layers, wherein each of the layers comprises 50 to 100 percent by weight LLDPE with a melt index of 0.2 to 2 g/10 min, and a density in a range of 0.915 to 0.936 g/cm$^3$, and the foamed film has a surface with an average Sheffield smoothness of less than 100, and wherein the core foam layer has a density between 0.56 g/cm$^3$ and 0.935 g/cm$^3$ and a cell density of $10^2$ to $10^9$ cells/cm$^3$ wherein the foamed film has a puncture propagation tear resistance greater than 500 g/mil, and wherein the core foam layer comprises a nucleating agent and has an average cell size of 10 to 100 μm, and wherein a supercritical physical blowing agent is introduced into molten resin inside a mixing section of an extruder, the supercritical blowing agent used is nitrogen, carbon dioxide or a mixture of nitrogen and carbon dioxide.

2. The film of claim 1 which is produced by a blown film process or a cast film process.

3. The film in claim 2 which is produced using an extrusion die with a die gap of 0.45 to 1.3 mm.

4. The film in claim 2 wherein the film is produced by the blown film process using an annular extrusion die and a blow-up ratio of 2:1 to 3.5:1.

5. The film of claim 1 wherein the supercritical blowing agent is introduced inside the mixing section of the extruder at an injection pressure of greater than 70 bar.

6. The film of claim 1 wherein the nucleating agent is an inorganic additive, an organic additive or a mixture of an inorganic additive and an organic additive.

7. The film of claim 1 wherein at least one layer comprises one or more of pigments, antistatic agents, UV stabilizers, and/or antioxidants.

8. The film of claim 1 wherein the film has an average Sheffield smoothness of less than 30.

9. The film in claim 1 which is produced using an extrusion die with a die gap of 0.45 to 1.3 mm.

10. The film in claim 1 wherein the film is produced by a blown film process using an annular extrusion die and a blow-up ratio of 2:1 to 3.5:1.

11. An article prepared using the film of claim 1.

* * * * *